C. H. FELKER.
POULTRY WATERING DEVICE.
APPLICATION FILED FEB. 20, 1909.
946,666.
Patented Jan. 18, 1910.
2 SHEETS—SHEET 1.
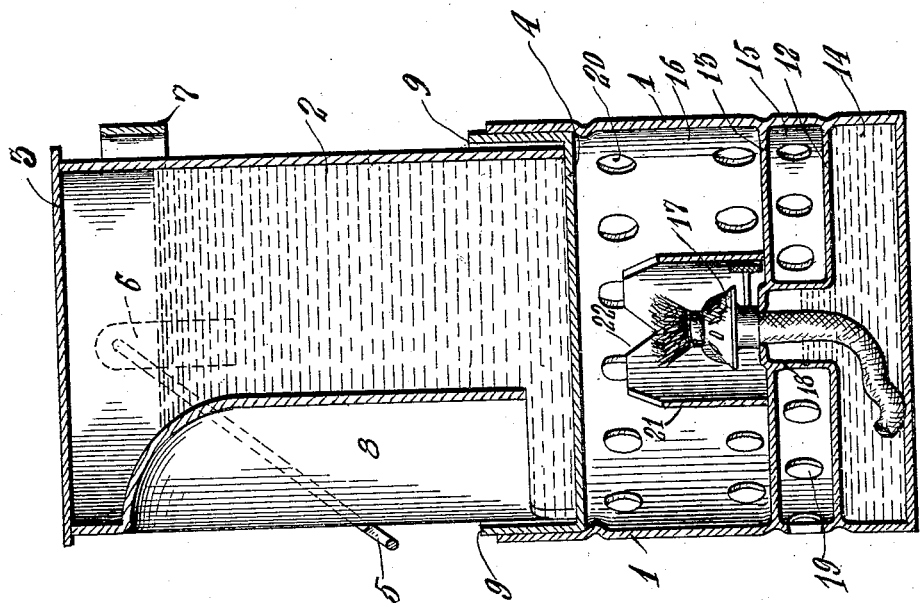
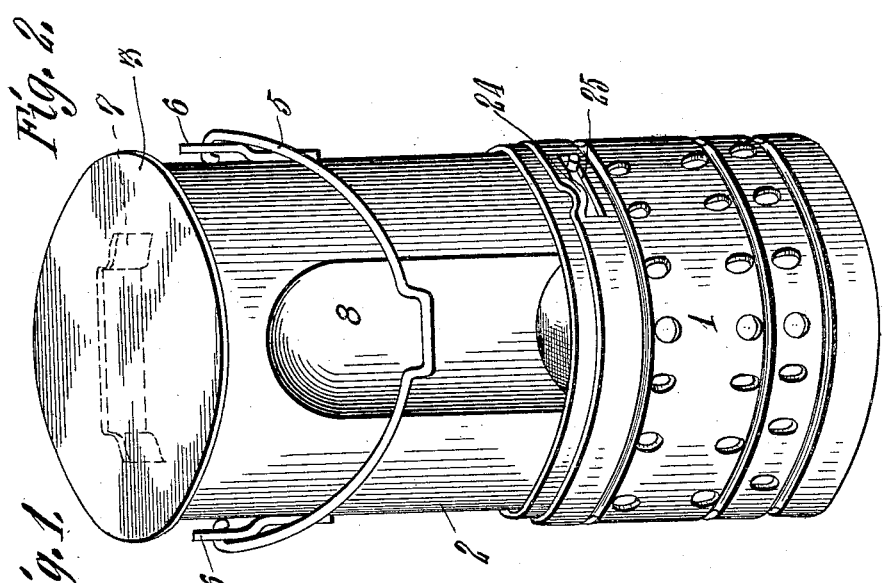
Witnesses
Morris Lessin
E. M. Ricketts
Inventor
C. H. Felker
By Watson E. Coleman
Attorney

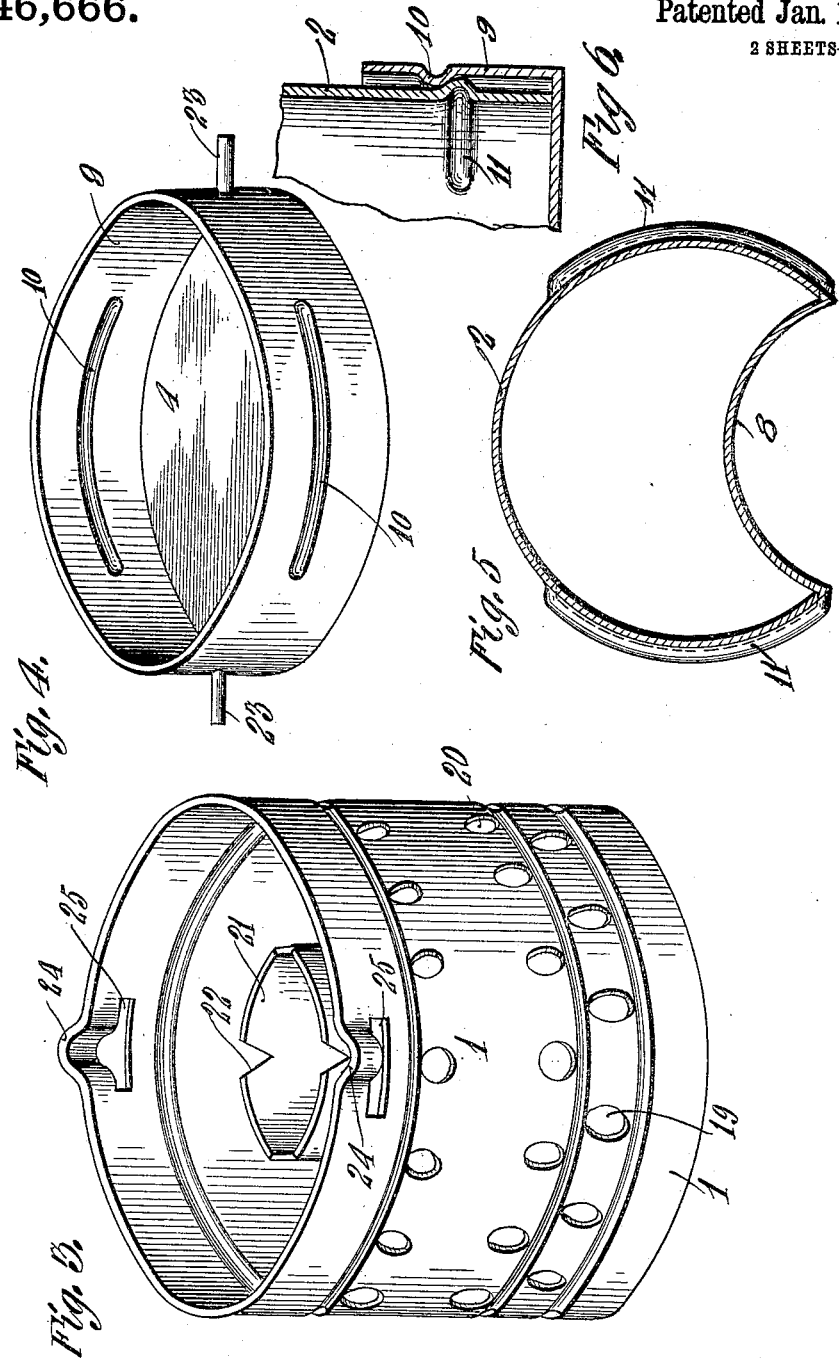

UNITED STATES PATENT OFFICE.

CHARLES H. FELKER, OF AVON, MASSACHUSETTS.

POULTRY-WATERING DEVICE.

946,666.   Specification of Letters Patent.   Patented Jan. 18, 1910.

Application filed February 20, 1909. Serial No. 479,120.

*To all whom it may concern:*

Be it known that I, CHARLES H. FELKER, a citizen of the United States, residing at Avon, in the county of Norfolk and State of Massachusetts, have invented certain new and useful Improvements in Poultry-Watering Devices, of which the following is a specification, reference being had to the accompanying drawings.

This invention relates to improvements in watering devices for poultry and pigeons, and it consists in the novel construction, combination and arrangement of parts hereinafter fully described and claimed.

The object of the invention is to provide a simple and practical device of this character which may be produced at a small cost and will be strong and durable, and which will be sanitary and easy to fill and keep clean.

The above and other objects of the invention are attained in its preferred embodiment illustrated in the accompanying drawings, in which—

Figure 1 is a perspective view of the improved watering device; Fig. 2 is a vertical front to rear sectional view; Fig. 3 is a detail perspective of the lower or base portion of the device; Fig. 4 is a perspective view of the bottom pan of the water receptacle or reservoir; Fig. 5 is a horizontal section through the water receptacle or reservoir; and Fig. 6 is a detail sectional view showing the interlocking connection between the reservoir and its bottom pan.

The invention comprises a lower or base section 1 which forms a heater casing and also a support for the water receptacle or reservoir 2. The latter comprises a cylindrical body having a closed top 3 and an open lower end adapted to be closed by a removable bottom pan 4. This bottom pan has a detachable connection with the body or reservoir 2 and also with the support or casing 1, so that the entire device may be suspended from a nail or the like upon a wall or other support by means of a bail handle 5 pivoted in ears 6 upon the opposite sides of the upper portion of the reservoir 2. To steady the device when thus suspended or when pushed close against a wall or other vertical object, a bracket 7 is secured to the rear portion of the reservoir 2 and has a flat portion to engage the wall. Stamped in the front of the reservoir 2 is a depression 8 of substantially semi-cylindrical-shape provided for the purpose of exposing a portion of the bottom of the pan 4 to permit poultry or pigeons to have access to the water therein. Said bottom pan 4 is of cylindrical-shape and has an upstanding flange or side wall 9 to receive the lower or open end of the reservoir 2.

The detachable connection between the body of the reservoir and the bottom pan is effected by stamping inwardly at diametrically opposite points in the wall or rim 9 of the pan, ribs 10 and stamping outwardly at diametrically opposite points in the lower portion of the side wall of the reservoir 2, ribs 11. The ribs 10, 11 extend less than one-fourth of the circumference of the parts 9, 2 so that when they are out of register with each other the reservoir 2 may be lowered into the pan 4 until the ribs 11 are disposed beneath the horizontal plane of the ribs 10, whereupon, the reservoir and pan may be given a quarter turn with respect to each other to bring the ribs 11 beneath the ribs 10, as shown in Fig. 6 of the drawings, to thereby lock the parts 2, 4 together.

The combined support and heater casing 1 is of cylindrical form and has in its bottom two horizontally disposed partitions 12, 13 which divide its interior into three chambers or compartments 14, 15, 16. The lowermost compartment 14 forms a reservoir for the oil burned in the heater or burner 17, which latter is arranged in the upper compartment or chamber 16 and is at the top of an upright tubular portion 18 which unites the two partitions 12, 13 and communicates with the oil reservoir 14. The compartment or chamber 15 provides a ventilating space between the oil reservoir and the heater or burner chamber 16 and thereby prevents the heat of the burner from reaching the oil in the reservoir, the surrounding side wall of the chamber 15 being formed with openings 19, whereby air may circulate through said chamber 15. The surrounding wall of the uppermost or burner chamber 16 is also provided with air inlet openings 20 arranged preferably in upper and lower rows, as shown, a sufficient number being provided to permit a proper supply of oxygen to the burner 17. To prevent the flame of this burner from being blown out or otherwise affected by wind and draft, a removable guard wall 21 is placed around it. Said wall 21 is in the form of an open ended cylinder which rests upon the partition 13 and which has its upper edge formed with V-shaped notches 22. The detachable connection between the pan 4 and support or casing 1 is preferably effected by providing upon the pan, at diametrically opposite points, radially projecting pins 23 adapted to pass through outwardly stamped vertical channeled portions 24 formed at diametrically opposite points on the upper edge of the casing 1. The channeled portions or grooves 24 communicate with horizontal slots 25 formed in the casing 1 and adapted to receive the pins 23, which when turned out of vertical alinement with the channels or grooves 24, by the slight rotary movement of the pan and casing with respect to each other, causes these parts to be locked together, as will be readily understood upon reference to Fig. 1.

In using the invention, when it is desired to fill the reservoir 2, it is removed from the casing or support 1 by detaching its pan 4 from the same and said pan is then removed from the body of the reservoir. The latter is then inverted and filled with water and the pan is replaced and locked. The reservoir is then righted so that a constant level of water will be maintained in the pan, the level being determined by the height of the bottom edge of the depression 8 above the bottom of the pan. After the reservoir is filled, its pan 4 may be engaged with and locked to the support or casing 1. It will be noted that by constructing the reservoir in this manner, it may be quickly and easily taken apart for filling and cleaning purposes and that by stamping out the depression 8 in the wall of the reservoir, the exposed portion of the water in the pan will be protected against the dropping of dirt into the water and also against any danger of the water being splashed or thrown out and wasted. The peculiar construction of the heater renders it entirely safe so that there will be no danger of a fire. The bail handle 5 permits the device to be conveniently carried and readily hung up. The provision of the bracket 7 causes the device to hang flat against or in a vertical position upon a wall or other support or when it stands against a wall steadies the device so that it cannot be easily overturned.

Having thus described the invention what is claimed is:

1. The herein described poultry watering device comprising a cylindrical reservoir having a closed top, an open bottom and a side wall formed at one point with a concaved depression, the bottom edge of the latter being disposed above the bottom edge of the remaining portion of the side wall, the latter being also formed at opposite points and on opposite sides of said depression with outwardly stamped locking ribs extending approximately a quarter of the circumference of the reservoir, a removable bottom pan having an upstanding surrounding rim to receive the bottom of the reservoir, said rim being formed at diametrically opposite points with inwardly stamped ribs extending a distance approximately a quarter of the circumference of the pan and disposed a greater distance above the bottom of the pan than the ribs on the reservoir are above the bottom edge of the latter, whereby said ribs will engage each other to lock the pan to the reservoir, a base having a detachable connection with said pan and means carried by the reservoir for suspending the same.

2. A poultry watering device comprising a supporting base having an open circular top formed at opposite points with slots and with outwardly stamped loops arranged at the opposite ends of said slots and forming vertical channels communicating with the same, a reservoir having a closed top, an open bottom and a depression in one of its sides, a pan detachably secured on the open bottom of the reservoir and adapted to enter the open top of said support and oppositely disposed radially projecting pins arranged upon the pan and adapted to pass through the vertical channels formed by said outwardly stamped loops, and to enter said slots, whereby the pan will be removably secured in the support.

In testimony whereof I hereunto affix my signature in the presence of two witnesses.

CHARLES H. FELKER.

Witnesses:
RICKARD H. COLE,
RAYMOND W. HIGGINS.